United States Patent [19]

Forschner et al.

[11] 3,863,531
[45] Feb. 4, 1975

[54] METHOD FOR FORMING HOLES

[75] Inventors: Robert H. Forschner, Apollo;
Robert J. Kushner, Creighton, both of Pa.

[73] Assignee: Aluminum Company of America, Pittsburgh, Pa.

[22] Filed: Feb. 26, 1974

[21] Appl. No.: 445,937

[52] U.S. Cl. .................................. 83/54, 83/689
[51] Int. Cl. ............................ B26d 3/00, B26f 1/00
[58] Field of Search .............................. 83/54, 689

[56] References Cited
UNITED STATES PATENTS

| | | | |
|---|---|---|---|
| 3,259,003 | 7/1966 | Griffin | 83/54 |
| 3,721,144 | 3/1973 | Yamamori | 83/689 X |
| 3,750,505 | 8/1973 | Organ et al. | 83/54 |
| 3,818,789 | 6/1974 | Vargo | 83/689 X |

*Primary Examiner*—Willie G. Abercrombie
*Attorney, Agent, or Firm*—David W. Brownlee, Esq.

[57] ABSTRACT

A composite assembly has holes formed through parallel outer walls thereof made of rigid plastic and metal using a punch having a rectangular cross section with four projecting corners and cutting edges between the corners angled with respect to die travel for shearing through the plastic wall without splintering it. The composite assembly has longitudinally extending webs therein between the plastic and metal walls along both sides of the area through which the holes are to be cut for supporting the plastic wall during piercing and shearing and thereby helping to prevent cracking and splintering of the plastic walls.

6 Claims, 6 Drawing Figures

METHOD FOR FORMING HOLES

BACKGROUND OF THE INVENTION

1. Field of Art

This invention relates to forming holes through spaced walls, and in particular to forming holes through the walls of a composite assembly having walls of rigid plastic and metal as in the sash frame members of an insulated window construction.

2. Brief Description of the Prior Art

A variety of methods and apparatus are well known for punching, cutting and shearing metal and plastic articles to form holes in them or to shape them to a desired configuration. Included are methods and apparatus for forming holes through spaced walls of composite assemblies or hollow articles, but the available choice of techniques has been limited in some materials such as rigid plastic due to the unsupported nature of the walls in some articles and the tendency of rigid plastic to crack or split when stressed during the hole-forming operation.

An example of an assembly in which holes may be formed are the frame members in window constructions for residential and commercial buildings. In some window constructions, the frames are made of composite assemblies including parallel spaced walls of rigid plastic and metal such as aluminum or an alloy thereof. These frame members frequently have holes through them for mounting a latch, operator or the like.

Heretofore, the composite assemblies for the sash frame have had holes cut in the metal and plastic parts prior to assembly of the metal and plastic parts into a composite. This practice has presented problems in alignment of holes through the metal and plastic. It is therefore desirable to provide a simple and convenient method and apparatus for forming holes through spaced walls such as the walls in a sash frame which are made of rigid plastic and metal materials without cracking or splitting the plastic.

The prior art is lacking in the disclosure of a method for forming holes through spaced walls, at least one wall of which is plastic, without splitting or cracking the plastic.

SUMMARY OF THE INVENTION

This invention provides a method and apparatus for forming a hole or holes in hollow articles having longitudinally extending support webs between substantially parallel walls by introducing the article between a supporting die and a punch having a recessed material engaging face with projecting corners and cutting edges between the corners for shearing the wall in the tubular member when the die and punch are closed against the article. The support webs between the wall of the article are contiguous the area through which the hole is cut and help prevent cracking or splitting of a plastic.

Accordingly, an object of this invention is to provide a method and apparatus for forming a hole through a wall of a hollow article.

Another object of this invention is to provide a method and apparatus for forming a hole through the wall of a composite article having substantially parallel walls of plastic and metal without splitting or cracking the plastic.

A further object of this invention is to provide a method and apparatus for forming a hole in a plastic wall of a composite article in which the plastic wall is supported by means of longitudinally extending webs in the article.

Another object of this invention is to provide a punch having a recessed material engaging face with projecting corners and cutting edges between the corners for piercing and shearing a plastic wall.

The above and other objects and advantages of this invention will be more fully understood and appreciated with reference to the following description and the drawings appended hereto.

DESCRIPTION OF A PREFERRED EMBODIMENT AND METHOD

Figure 1:
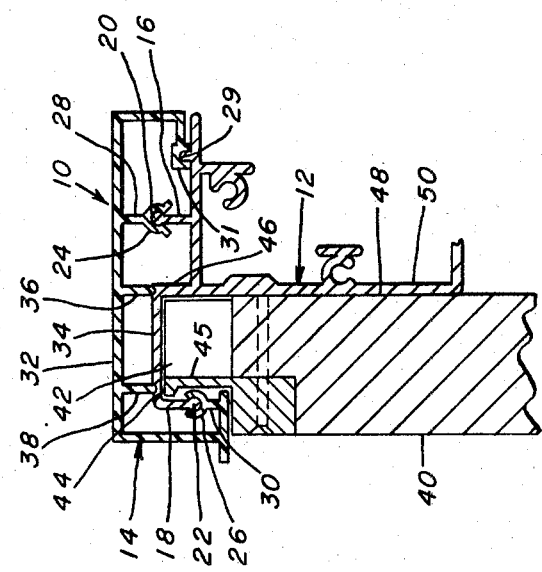
FIG. 1 is a fragmentary cross sectional view through a composite assembly for a window sash frame in which holes are to be formed, and illustrating a support die in position under a portion of the assembly.

FIG. 1 illustrates a typical composite frame assembly 10 for a window sash which includes an extruded aluminum member 12 and an extruded rigid vinyl member 14 which are secured together by snap fit between ball and socket members on the extrusions. In the embodiment illustrated, the metal member 12 has longitudinally extending ribs 16 and 18 with bulbous ends 20 and 22 on them which are engaged in socket members 24 and 26 on longitudinally extending flanges 28 and 30 on the vinyl member 14. The metal member 12 also a rib 29 which fits in a grooved member 31 on the vinyl member 14 for interconnecting the two members.

As assembled, the sash frame has a rigid vinyl wall 32 and an aluminum wall 34 spaced from the vinyl wall and parallel thereto. In assemblies which are to have latches or operators mounted thereon, holes through the vinyl and aluminum walls 32 and 34 are usually required. Heretofore, it has been conventional to cut the holes in the aluminum and vinyl members prior to assembly of the members into a composite assembly. The members have been assembled into the composite subsequent to the formation of the holes therein, and it has sometimes been difficult to align the holes in the members. This invention makes it possible to form aligned holes through aluminum and rigid plastic walls in a composite assembly without cracking or splitting the vinyl member during the formation of the holes.

In accordance with this invention, longitudinally extending webs 36 and 38 are provided on the vinyl member 14 adjacent the area through which holes are to be formed. Webs 36 and 38 span the gap between walls 32 and 34 and support the vinyl wall during the formation of a hole or holes therein. In the preferred embodiment, the supporting webs are provided on the vinyl member, but such supporting webs may alternatively be provided on the aluminum member. By providing the webs on the vinyl member, heat transfer through a window sash will be less than if the webs were provided on the aluminum member because vinyl webs conduct less heat through the composite assembly than would aluminum webs.

Figure 4:
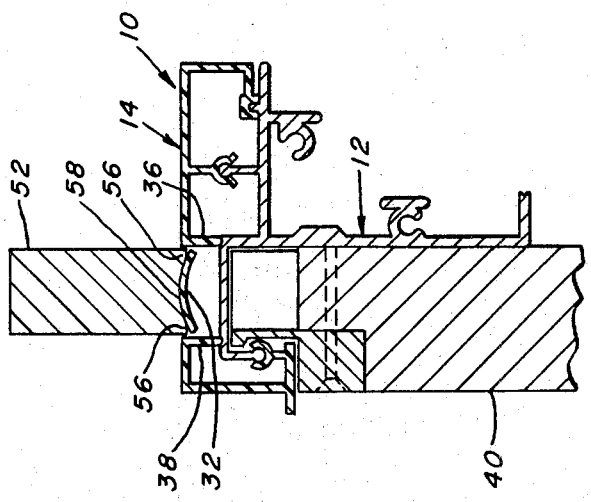
FIG. 4 is a fragmentary cross-sectional view similar to FIG. 1 showing the punch as it starts through the composite assembly.

The numeral 40 designates the die assembly which is used to support the composite assembly 10 during formation of a hole through the walls 32 and 34 of the aluminum and vinyl members 12 and 14. Die 40 has two upwardly projecting support posts 42 (FIG. 5) on opposite ends of the location of the holes to be formed in the assembly 10, and a die insert 44 with an upwardly projecting longitudinally extending leg 45 on it between the posts 42. The upper faces of the posts 42 and leg 45 underlie and support aluminum wall 34 immediately adjacent the location of the holes to be formed in the assembly 10 whereby the posts and leg, in cooperation with wall 46 on the aluminum member form a die aperture for forming such holes. The lateral face of leg 45 toward ball and the socket joint 22-26 is undercut as shown in FIGS. 1 and 4 for receiving the C-shaped socket 26 on the vinyl member 14 whereby the top of the leg 45 can be disposed substantially flush against the vertical flange 18 on the aluminum member. Die 40 further has a lateral face 48 for engagement against the vertical wall 50 on the aluminum member 12. Composite assembly 10 is adapted to be positioned on die 40 by sliding or telescoping the elongate composite assembly over the die with posts 42 and leg 45 extending into the recess in the assembly as is illustrated in FIG. 1.

Figure 2:
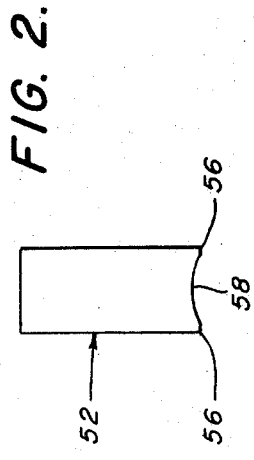
FIG. 2 is an elevational view of one side edge of a punch for forming holes through the walls of the tubular member illustrated in FIG. 1.
Figure 3:
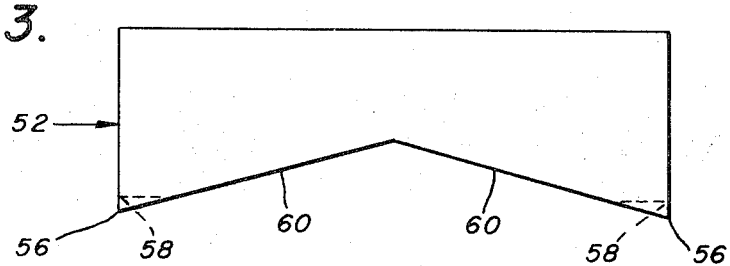
FIG. 3 is an elevation view of another side of the punch at 90° to FIG. 2.

FIGS. 2 and 3 illustrate a punch 52 which is adapted to be displaced lineally against composite assembly 10 supported on die 40 to form holes through walls 32 and 34 of the composite assembly. Punch 52 has a generally rectangular cross sectional configuration with an anterior end having projecting corners 56 thereon and cutting edges 58 and 60 between the corners angled with respect to the direction of punch travel. Corners 56 on punch 52 are preferably squared off or "broken" to insure that they will not be excessively worn by repeated piercing of the metal wall in a composite assembly. Cutting edges 58 across the narrow dimension of punch 52 may be rounded as is illustrated in FIG. 2, which is a relatively easy surface to form across the narrow width of the punch, but may also have a straight upward taper to a point midway between the corners of the punch. Cutting edges 60 are formed at an angle to horizontal and extend along a substantially straight line from the corners 56 upwardly to a point midway between the corners.

Figure 5:
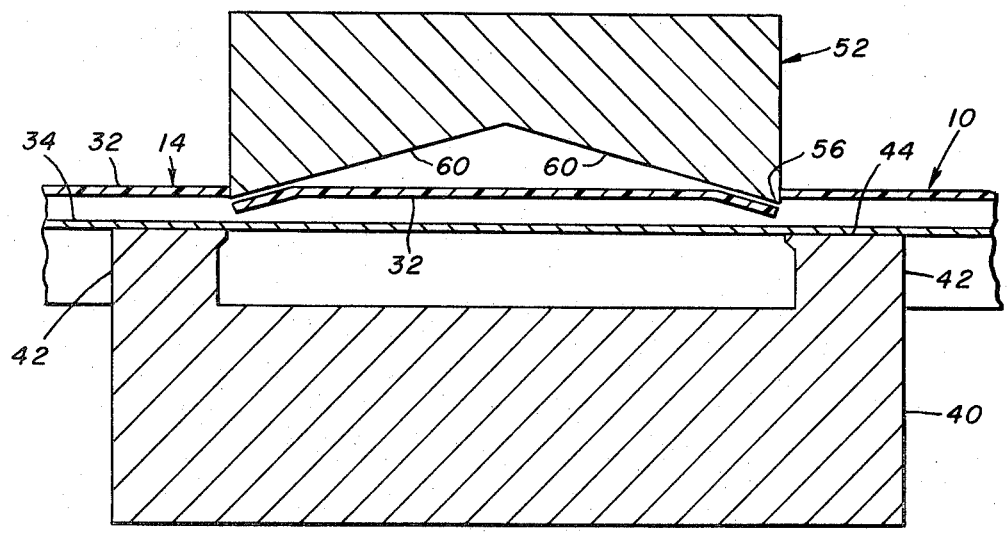
FIG. 5 is a cross sectional view at a right angle to FIG. 4 illustrating the punch piercing and shearing a hole through the rigid vinyl member of the composite assembly.

Die 40 and punch 52 are adapted to be mounted in a press for lineal displacement of one of such members toward the other for forming holes in a composite assembly 10 which is mounted on the die 40. FIGS. 4 and 5 illustrate the tools as the punch 52 is moved toward the die 40 with the corners 56 on the punch piercing the vinyl wall 32 in member 14 to commence formation of a hole through such wall. Support webs 36 and 38 on the vinyl member 14 help to support wall 32 during such piercing and help to prevent splitting or cracking of the vinyl member. The projecting corners 56 on punch 52 are able to pierce the vinyl wall 32 with a minimum of stress on the vinyl member 14 because each of the corners is initially moved against a relatively small area on the vinyl wall.

Figure 6:
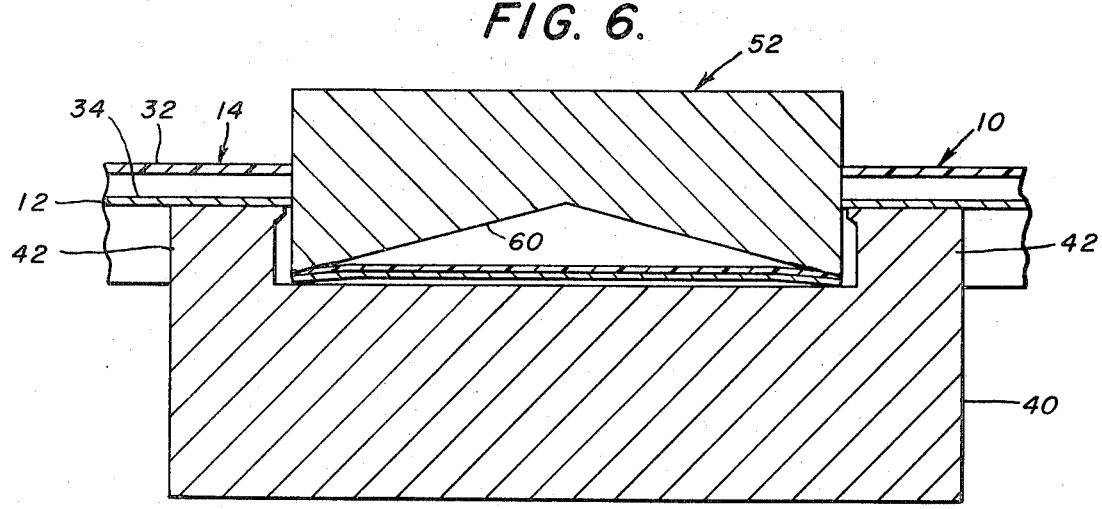
FIG. 6 is a cross sectional view similar to FIG. 5 illustrating completion of the hole-forming operation prior to withdrawal of the punch from the holes which have been formed.

As the punch 52 continues to move toward die 40, cutting edges 58 and 60 on the punch shear or cut the vinyl wall 32 progressively along the lengths of the cutting edges which also exerts a minimum of stress on the vinyl member. Again webs 36 and 38 on the vinyl member 14 support wall 32 as the hole is being formed therein. Continued lineal displacement of punch 52 next pierces aluminum wall 34 on aluminum member 12 and shears a hole through the aluminum member as is illustrated in FIG. 6. Upon completion of formation of holes in walls 32 and 34 of members 12 and 14, the punch 52 is retracted or withdrawn from the holes which have been formed in the assembly 10, and the assembly 10 is removed from die 40 preparatory to placement of another assembly on the die and forming of holes in it.

It is seen that this invention provides a method and apparatus for forming holes in the walls of a hollow or tubular assembly and in particular, a composite assembly having one wall which is made of rigid plastic material supported by webs which help prevent cracking or splitting of the wall as a hole is being formed therethrough. Although a preferred embodiment and method have been illustrated and described, it will be apparent to those skilled in the art that numerous modifications could be made in the disclosed method and apparatus without departing from the invention or the scope of the claims appended hereto.

What is claimed is:

1. In the fabrication of a hollow article having a hole through a wall thereof comprising the steps of:
   introducing a hollow article having substantially parallel walls and longitudinally extending support webs therebetween, between a supporting die and a punch having an anterior end with projecting corners and cutting edges around the periphery of the end between the corners angled with respect to die travel,
   lineally displacing at least one of said die or punch to pierce a wall of said hollow article with the projecting corners on the punch in the area between the support webs in the article, and
   continuing the lineal displacement of said die or punch to shear the wall of the article with the cutting edges of the punch to cut a hole through said wall.

2. In a method as set forth in claim 1 forming a rectangular hole using a punch having a rectangular cross section with four projecting corners thereon.

3. In a method as set forth in claim 1 supporting the article on a die having an aperture therein mating with the punch.

4. In a method as set forth in claim 1 forming holes through outer walls of a composite assembly having a rigid plastic wall and a metal wall.

5. In a method as set forth in claim 4 in which the punch is first moved against the plastic wall to form a hole in it and thereafter against the metal wall to form a hole in it.

6. In a method as set forth in claim 1 in which the die has support post adjacent opposite ends of the location of the hole to be formed in the article and a supporting leg along one side of the hole location which cooperate with a wall of the composite article to provide a die aperture into which the punch is moved to form holes through two parallel walls of the article.

* * * * *